US012651411B1

(12) United States Patent
Mason

(10) Patent No.: US 12,651,411 B1
(45) Date of Patent: Jun. 9, 2026

(54) AVATAR MODELING AND GENERATION

(71) Applicant: Apple Inc., Cupertino, CA (US)

(72) Inventor: Andrew P. Mason, Perth (AU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/523,008

(22) Filed: Nov. 29, 2023

Related U.S. Application Data

(63) Continuation of application No. 17/082,948, filed on Oct. 28, 2020, now Pat. No. 11,869,150, which is a continuation of application No. 15/996,374, filed on Jun. 1, 2018, now abandoned.

(60) Provisional application No. 62/513,587, filed on Jun. 1, 2017.

(51) Int. Cl.
| | |
|---|---|
| *G06T 17/00* | (2006.01) |
| *G06N 5/046* | (2023.01) |
| *G06T 15/04* | (2011.01) |
| *G06T 17/20* | (2006.01) |
| *G06T 19/20* | (2011.01) |
| *G06V 40/16* | (2022.01) |

(52) U.S. Cl.
CPC ............. *G06T 17/20* (2013.01); *G06N 5/046* (2013.01); *G06T 15/04* (2013.01); *G06T 19/20* (2013.01); *G06V 40/175* (2022.01); *G06V 40/176* (2022.01); *G06T 2207/20081* (2013.01)

(58) Field of Classification Search
CPC ....... G06T 17/20; G06T 15/04; G06V 40/176; G06V 40/175; G06N 5/046

USPC .......................................................... 345/419
See application file for complete search history.

(56) References Cited

U.S. PATENT DOCUMENTS

| | | | |
|---|---|---|---|
| 6,580,811 | B2 | 6/2003 | Maurer |
| 6,608,624 | B1 | 8/2003 | Wang |
| 8,553,037 | B2 | 10/2013 | Smith |
| 9,196,074 | B1 | 11/2015 | Bhat |
| 10,181,213 | B2 | 1/2019 | Bullivant |

(Continued)

OTHER PUBLICATIONS

Alotaibi, Sarah and William A. P. Smith, "A Biophysical 3D Morphable Model of Face Appearance," 2017 IEEE International Conference on Computer Vision Workshops (ICCVW), Oct. 22-29, 2017.

(Continued)

*Primary Examiner* — Thomas J Lett
(74) *Attorney, Agent, or Firm* — Blank Rome LLP

(57) ABSTRACT

Techniques are disclosed for providing an avatar personalized for a specific person based on known data from a relatively large population of individuals and a relatively small data sample of the specific person. Auto-encoder neural networks are used in a novel manner to capture latent-variable representations of facial models. Once such models are developed, a very limited data sample of a specific person may be used in combination with convolutional-neural-networks or statistical filters, and driven by audio/visual input during real-time operations, to generate a realistic avatar of the specific individual's face. In some embodiments, conditional variables may be encoded (e.g. gender, age, body-mass-index, ethnicity, emotional state). In (Continued)

other embodiments, different portions of a face may be modeled separately and combined at run-time (e.g., face, tongue and lips). Models in accordance with this disclosure may be used to generate resolution independent output.

20 Claims, 14 Drawing Sheets

(56) References Cited

U.S. PATENT DOCUMENTS

| | | | |
|---|---|---|---|
| 10,467,803 B1 | 11/2019 | Degtyarev | |
| 10,636,192 B1 | 4/2020 | Saragih | |
| 10,636,193 B1 | 4/2020 | Sheikh | |
| 10,796,476 B1 | 10/2020 | Xing | |
| 10,818,038 B2 | 10/2020 | Beeler | |
| 10,860,838 B1 | 12/2020 | Elahie | |
| 11,055,514 B1 | 7/2021 | Cao | |
| 11,120,600 B2 | 9/2021 | Stoyles | |
| 11,257,289 B2 * | 2/2022 | Venkataraman | G06T 17/20 |
| 11,282,255 B2 | 3/2022 | Kuribayashi | |
| 11,303,850 B2 | 4/2022 | Tong | |
| 11,430,169 B2 | 8/2022 | Comer | |
| 2005/0008209 A1 | 1/2005 | Matsumoto | |
| 2010/0257214 A1 | 10/2010 | Bessette | |
| 2010/0333017 A1 | 12/2010 | Ortiz | |
| 2014/0035929 A1 | 2/2014 | Iain | |
| 2014/0201126 A1 | 7/2014 | Zadeh | |
| 2015/0125049 A1 | 5/2015 | Taigman | |
| 2015/0193718 A1 | 7/2015 | Shaburov | |
| 2015/0242461 A1 | 8/2015 | Kung | |
| 2016/0042548 A1 | 2/2016 | Du | |
| 2016/0142767 A1 | 5/2016 | Shigeta | |
| 2016/0180568 A1 | 6/2016 | Bullivant | |
| 2016/0360970 A1 * | 12/2016 | Tzvieli | A61B 5/0075 |
| 2017/0069124 A1 | 3/2017 | Tong | |
| 2017/0193286 A1 | 7/2017 | Zhou | |
| 2018/0096511 A1 | 4/2018 | Beeler | |
| 2018/0114264 A1 | 4/2018 | Rafii | |
| 2018/0157901 A1 | 6/2018 | Arbatman | |
| 2018/0308276 A1 | 10/2018 | Cohen | |
| 2018/0336714 A1 | 11/2018 | Stoyles | |
| 2018/0373925 A1 | 12/2018 | Wang | |
| 2019/0172242 A1 | 6/2019 | Bullivant | |
| 2019/0213772 A1 | 7/2019 | Lombardi | |
| 2019/0313915 A1 | 10/2019 | Tzvieli | |
| 2020/0082572 A1 | 3/2020 | Beeler | |
| 2020/0114925 A1 | 4/2020 | Iwasaki | |
| 2020/0202622 A1 | 6/2020 | Gallo | |
| 2020/0219302 A1 | 7/2020 | Tarquini | |
| 2020/0302684 A1 | 9/2020 | Sunkavalli | |
| 2020/0349752 A1 | 11/2020 | Bullivant | |
| 2021/0256542 A1 | 8/2021 | Mcdaniel | |
| 2021/0390767 A1 | 12/2021 | Johnson | |
| 2023/0105458 A1 | 4/2023 | Bullivant | |
| 2023/0334907 A1 * | 10/2023 | Soares | G06N 3/044 |

OTHER PUBLICATIONS

Chickerur, Satyadhyan and Kartik Joshi, "3D face model dataset: Automatic detection of facial expressions and emotions for educational environments," Aug. 13, 2015.

Costigan, et al., "Facial Retargeting using Neural Networks," MIG '14 Proceedings of the Seventh International Conference on Motion in Games, Playa Vista, California, Nov. 6-8, 2014.

Dubey, Monika and Prof. Lokesh Singh, "Automatic Emotion Recognition Using Facial Expression: A Review," vol. 3, Issue 2, Feb. 2016.

Garrido, et al., "Corrective 3D Reconstruction of Lips from Monocular Video," ACM Transactions on Graphics, vol. 35, Issue 6, Article 219 Nov. 2016.

Gotardo, "Practical Dynamic Facial Appearance Modeling and Acquisition," ACM Trans. Graph., vol. 37, No. 6, Article 232, Nov. 2018.

Hong, et al., "Real-Time Speech-Driven Face Animation with Expressions Using Neural Networks," IEEE Transactions on Neural Networks, vol. 13, No. 1, Jan. 2002.

Jimenez, et al., "A Practical Appearance Model for Dynamic Facial Color," ACM Transactions on Graphics, vol. 29(5), SIGGRAPH Asia 2010.

Karras, et al., "Audio-Driven Facial Animation by Joint End-to-End Learning of Pose and Emotion," ACM Transactions on Graphics, vol. 36, No. 4, Article 94, Jul. 2017.

Kingma, Diederik P. and Max Welling, "Auto-Encoding Variational Bayes," 2013, CoRR, abs/1312.6114.

Laine, et al., "Facial Performance Capture with Deep Neural Networks," Sep. 21, 2016.

Lombardi, et al., "Deep Appearance Models for Face Rendering," Aug. 1, 2018, arXiv:1808.00362v1.

Mandl, et al., "Learning Lightprobes for Mixed Reality Illumination," 2017 IEEE International Symposium on Mixed and Augmented Reality (ISMAR).

Oyedotun, et al., "Facial Expression Recognition via Joint Deep Learning of RGB-Depth Map Latent Representations," IEEE International Conference on Computer Vision Workshops (ICCVW), Oct. 22-29, 2017.

Savran, et al., "Automatic Detection of Emotion Valence on Faces Using Consumer Depth Cameras," 2013 IEEE International Conference on Computer Vision Workshops, Dec. 2-8, 2013.

Thies, et al., "Deferred Neural Rendering: Image Synthesis using Neural Textures," Apr. 28, 2019, arXiv:1904.12356v1.

Tian, et al., "Recognizing Action Units for Facial Expression Analysis," IEEE Transactions on Pattern Analysis and Machine Intelligence, vol. 23, No. 2, Feb. 2001.

Videla, Lakshmi Sarvani, "Model Based Emotion Detection using Point Clouds," Aug. 3, 2015, Retrieved from the Internet: URL: https://www.slideshare.net/LakshmiSarvani1/model-based-emotion-detection-using-point-clouds [Retrieved on Aug. 9, 2018].

Weber, et al., "Learning to Estimate Indoor Lighting from 3D Objects," 2018 IEEE International Conference on 3D Vision (3DV).

* cited by examiner

605 — SELECT FIRST INPUT MESH FROM COLLECTION OF INPUT MESHES

600

610 — APPLY SELECTED INPUT MESH TO AUTO-ENCODER

615 — RECORD INPUT, LATENT VARIABLE AND OUTPUT VALUES FOR APPLIED MESH

620 — DONE

630 — SELECT NEXT INPUT MESH

NO

YES

625 — INPUT-TO-LATENT VARIABLE-TO-OUPUT MAPPING

705 CAPTURE EXPRESSION IMAGES

715 CONVERT TO MESHES

725 TRAIN AUTO-ENCODER NEURAL NETWORK

735 IDENTIFY EXPRESSION MODEL

700

710

720

730 EXPRESSION MODEL

125

1300

1305 — OBTAIN TEMPORAL SEQUENCE OF USER

1310 — APPLY TEMPORAL SEQUENCE TO CNN/ GENERIC NEUTRAL EXPRESSION MODEL

1315 — OBTAIN USER'S GENERIC NEUTRAL MESH

1320 — COMBINE WITH USER'S NEUTRAL MESH

1325 — DRIVE EXPRESSION NEURAL NETWORK MODEL

1400

1500

AVATAR MODELING AND GENERATION

BACKGROUND

This disclosure relates generally to electronic communication. More particularly, but not by way of limitation, this disclosure relates to techniques and systems for video communication using high-fidelity avatars.

Computerized characters that represent and are controlled by users are commonly referred to as avatars. Avatars may take a wide variety of forms including virtual humans, animals, and plant life. Some computer products include avatars with facial expressions that are driven by a user's facial expressions. One use of facially-based avatars is in communication, where a camera and microphone in a first device transmits audio and real-time 2D or 3D avatar of a first user to one or more second users such as other mobile devices, desktop computers, videoconferencing systems and the like. Known existing systems tend to be computationally intensive, requiring high-performance general and graphics processors, and generally do not work well on mobile devices, such as smartphones or computing tablets. Further, existing avatar systems do not generally provide the ability to communicate nuanced facial representations or emotional states.

DETAILED DESCRIPTION

Figure 1:
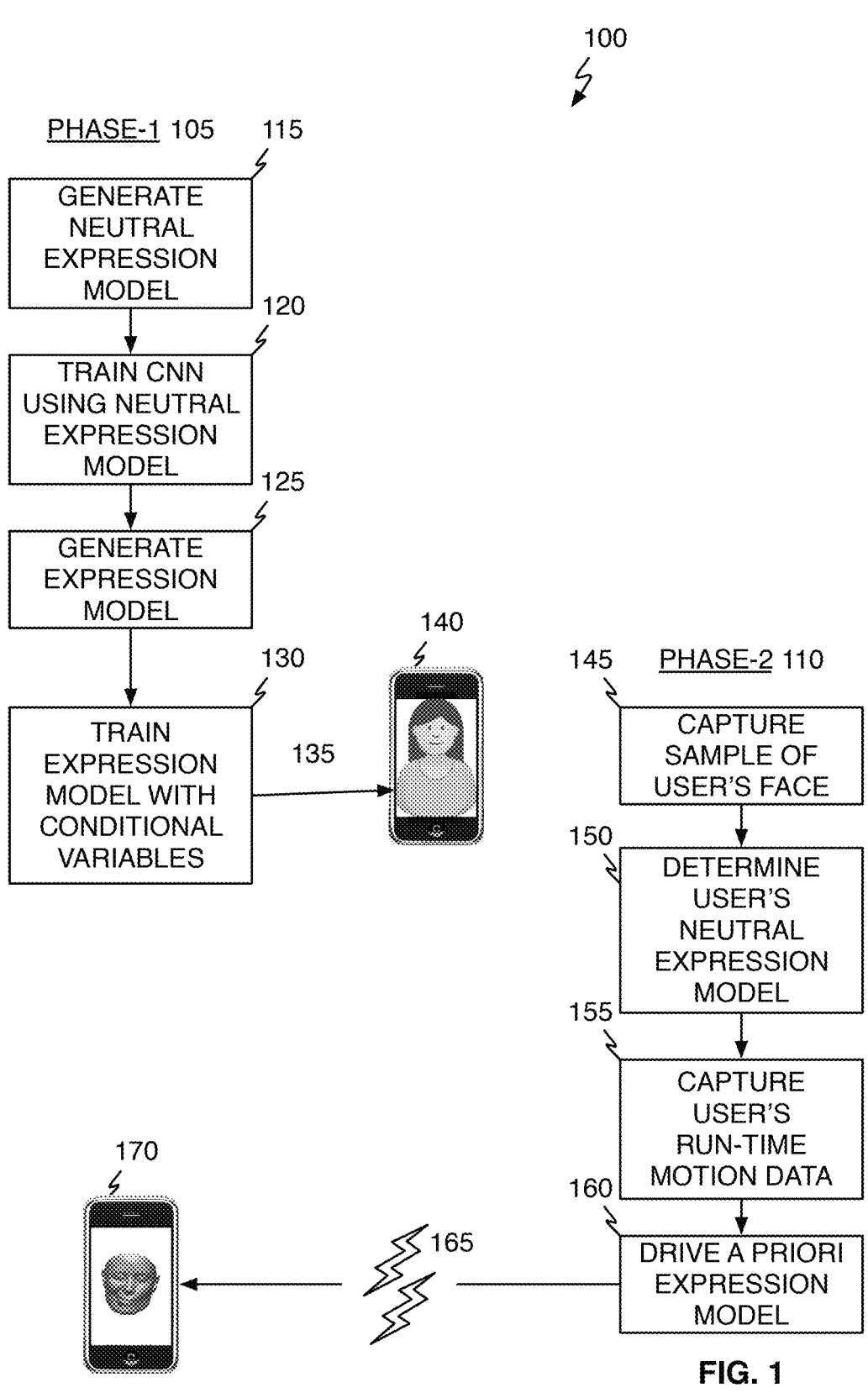
FIG. 1 shows, in flowchart form, an avatar generation and use operation in accordance with one or more embodiments.

This disclosure pertains to systems, methods, and computer readable media to improve the operation of graphic modeling systems. In general, techniques are disclosed for providing an avatar personalized for a specific person based on known data from a relatively large population of individuals and a relatively small data sample of the specific person. More particularly, techniques disclosed herein employ auto-encoder neural networks in a novel manner to capture latent-variable representations of "neutral" and "expression" facial models. Such models may be developed offline and stored on individual devices for run- or real-time use (e.g., portable and tablet computer systems as well as mobile/smart-phones). Based on a very limited data sample of a specific person, additional neural networks (e.g., convolutional-neural-networks, CNNs) or statistical filters (e.g., a Kalman filter) may be used to selectively weight latent variables of a first neural network model to provide a realistic neutral avatar of the person. This avatar, in turn, may be used in combination with the expression neural network and driven by audio and/or visual input during real-time operations to generate a realistic avatar of the specific individual; one capable of accurately capturing even small facial movements. In other embodiments, additional variables may also be encoded (e.g., gender, age, body-mass-index, ethnicity). In one embodiment, additional variables encoding a u-v mapping may be used to generate a model whose output is resolution-independent. In still other embodiments, different portions of a face may be modeled separately and combined at run-time to create a realistic avatar (e.g., face, tongue and lips).

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics modeling systems having the benefit of this disclosure.

Referring to FIG. 1, avatar generation operation 100 in accordance with one or more embodiments may include two phases. In phase-1 105 generic modeling data is gathered. In phase-2 110 that data, in combination with a limited amount of person-specific data, may be used to generate a high-quality avatar representative of that person. In accordance with this disclosure, phase-1 105 can begin with the offline or a priori generation of a neutral expression model based on a population of images (block 115). The neutral expression model may be alternately referred to as an identity model. The neutral expression model may correspond to a particular geometry of a user's face in a neutral pose (i.e. a pose that lacks expression). The neutral expression model from block 115 may then be used to train a convolutional neural network (CNN) for use during run-time operations. The CNN can be used to process streaming input such as video and/or audio (block 120). If desired, optional conditional variables may be applied to the neutral expression model to further refine the model's output. Illustrative conditional variables include, but are not limited to, gender, age, body mass index, and the like. In one or more embodiments, incorporating conditional variables into the neutral expression model may enable the model to better differentiate between facial characteristics associated with such factors as age, gender, body mass index, and the like.

Similar multi-person data may also be used to train or generate an expression model off-line or a priori (block 125). That is, the expression model may indicate a particular geometry of a user's face in an expressive state. Similar to above, if desired, optional conditional variables may be applied to the expression model to further refine the model's output (block 130). Illustrative conditional variables include, but are not limited to, gender, age, body mass index, as well as emotional state. That is, conditional variables may be incorporated into the expression model to better refine characteristics of various emotional states in the model, as well as other contributing characteristics, such as age, gender, and the like. The neutral expression model, the expression model and the CNN generated during Phase-1 105 operations may be stored (arrow 135) on electronic device 140. Once deployed in this manner, phase-2 110 can begin when a device's image capture unit(s) or camera(s) are used to acquire a relatively limited number of images of a specific person (block 145). Images of the specific person (e.g., a video stream) may be applied to the prior trained CNN to obtain the specific user's neutral expression model (block 150). As described later, audio streams may also be used to train a neural network expression model. In some embodiments the specific user's neutral expression model may be encoded and stored for future use. In one embodiment a user's neutral expression model may be represented as a mesh network. At run-time when the specific user is communicating with a second person via an application that employs an avatar, real-time images and/or audio may be captured of the specific user (block 155) and used to drive, in combination with the individual's neutral expression model, the prior developed expression model (block 160). The resulting animated avatar may be transmitted (arrows 165) to distal electronic device 170 and displayed. In one or more embodiments, obtaining separate neutral "identity" models and expression models may be more efficient than generating an avatar from a single model that considers identity and expression. Applying the expression model to the neutral expression "identity" model may provide a more streamlined and robust avatar system. As an example, if a user places their hand or other object in front of their face as they are utilizing the system, the separate expression model and neutral expression model may allow the system to fall back to the user's neutral face for a part of the face that is being obscured (where expression data is obscured). If a single model were used, the entire avatar may be degraded, or a generic face or portion of the face may be utilized, instead of the user's particular face or facial features.

Figure 2:
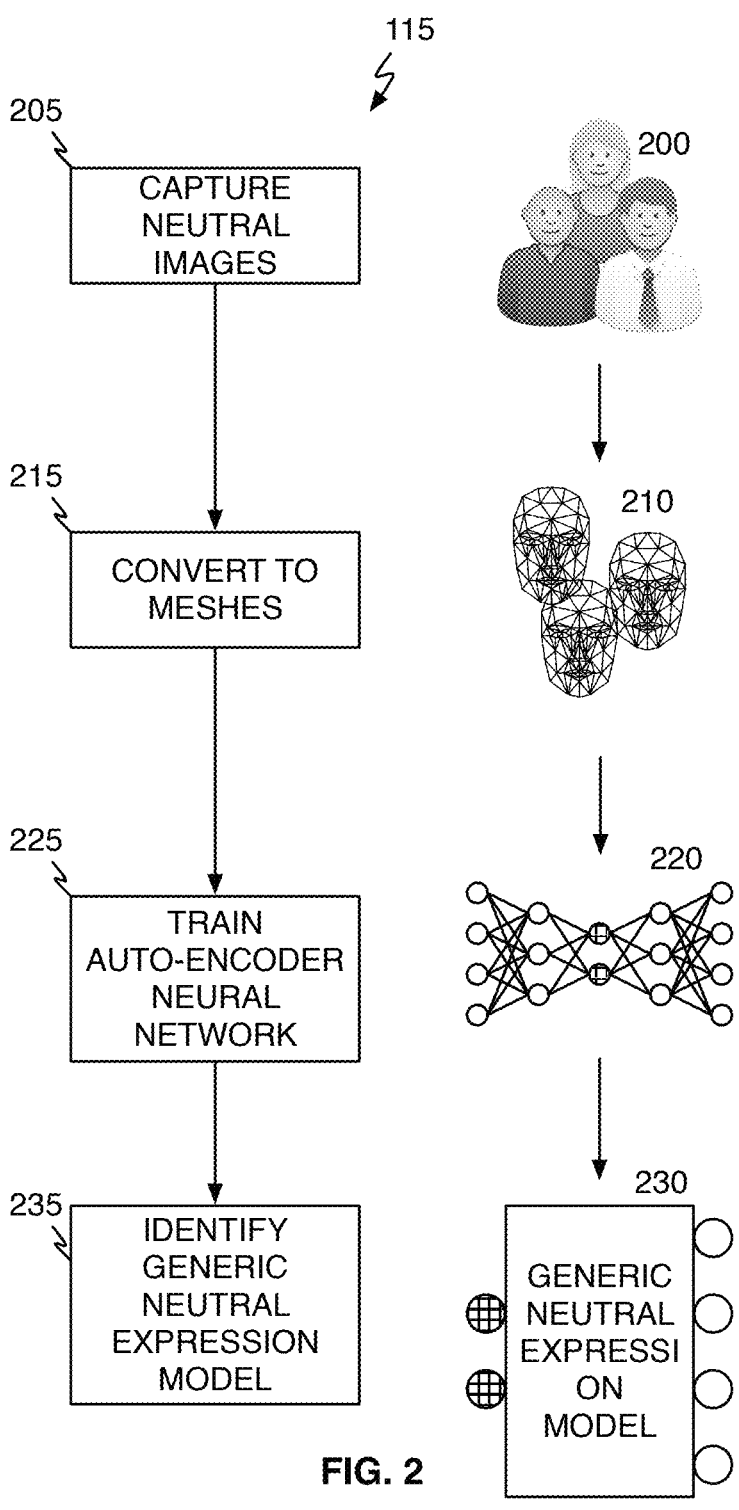
FIG. 2 shows a neutral expression model generation operation in accordance with one or more embodiments.

Referring to FIG. 2, in one or more embodiments neutral expression model generation operation 115 begins with the acquisition of neutral images 200 from a relatively large number of individuals (block 205). As used here, the phrase "neutral image" means an image of an individual having a neutral expression (e.g., not happy, not sad, not excited, not fearful, etc.). Images 200 may, for example, be obtained via a photogrammetry or stereophotogrammetry system, a laser scanner or an equivalent capture method. Each neutral expression image 200 may be converted into a three-dimensional (3D) mesh representation 210 (block 215) and used to train auto-encoder neural network 220 (block 225). From auto-encoder neural network 220, generic neutral expression model 230 can be identified (block 235).

Figure 3:
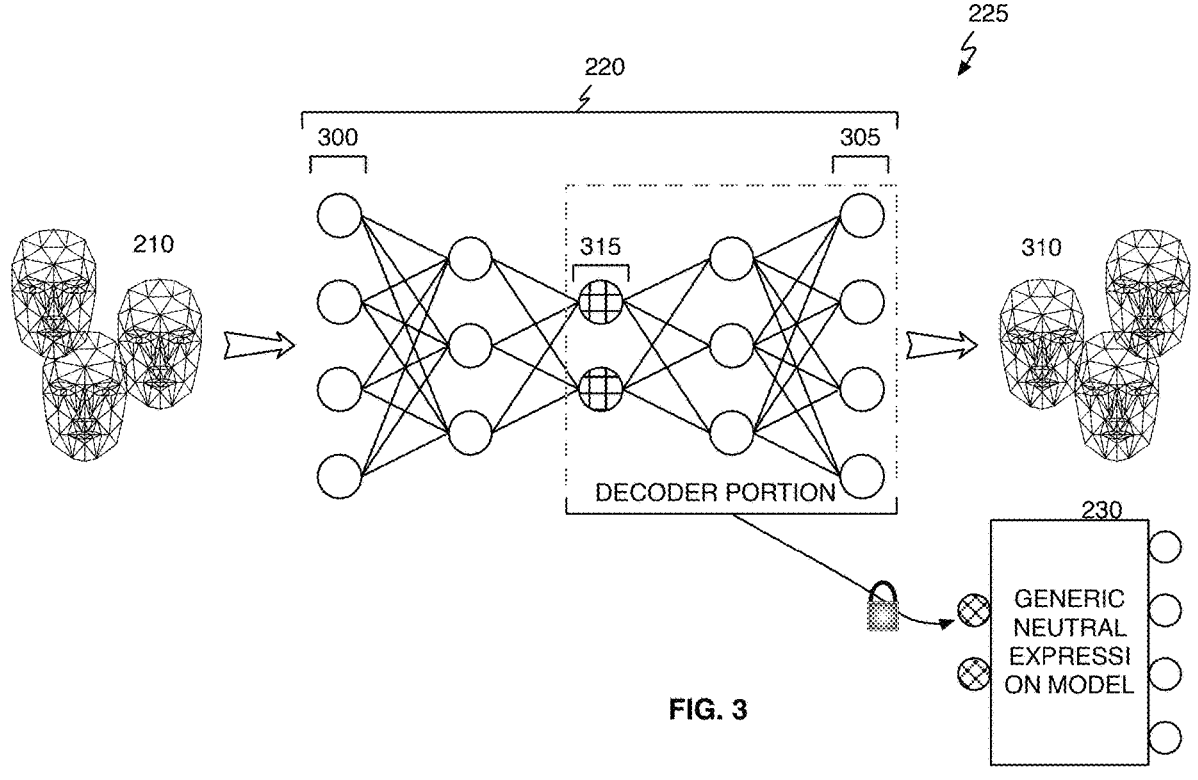
FIG. 3 shows an auto-encoder neural network training operation in accordance with one or more embodiments.

Referring to FIG. 3, in one or more embodiments auto-encoder neural network training operation 225 can apply each neutral expression 3D mesh from the collection of neutral expression 3D meshes 210 (one at a time to input layer 300) to train auto-encoder neural network 220 to generate (at output layer 305) output meshes 310 (one for each input mesh). Auto encoder neural network 220 may include a traditional auto-encoder or a variational auto-encoder. The variational auto-encoder may be trained in a probabilistic manner. In one embodiment, auto-encoder neural network 220 employs unsupervised learning technology to discover a function $f(x)=\hat{x}$, where x represents an input (e.g., one of meshes 210) and x represents an output (e.g., one of meshes 310). Training causes auto-encoder 220 to learn the identity function so that $x \approx \hat{x}$. By limiting the number of hidden units with respect to the number of input and output units, auto-encoder 220 can determine or identify a "compressed" representation of its input. As used here, the phrase "hidden units" refers to any layer of units within auto-encoder 220 that is between input layer 300 and output layer 305. By way of example, if there are 15,000 nodes in each input mesh (each node representing a 3D point), and 15,000 nodes in each output mesh, but only 15, 25, 30 or 50 nodes in a selected (hidden) layer within auto-encoder 220 (e.g., layer 315), the value of those nodes must represent or encode each input mesh's corresponding 15,000 node output mesh. When trained, the nodes of selected hidden layer 315 (e.g., that layer with the smallest number of nodes) represent the latent variables of the neural network system. Once auto-encoder neural network 220 has been trained, its decoder portion may be retained and locked (so that its internal node values no longer change or adapt to input) to form generic neutral expression model 230.

Figure 4:
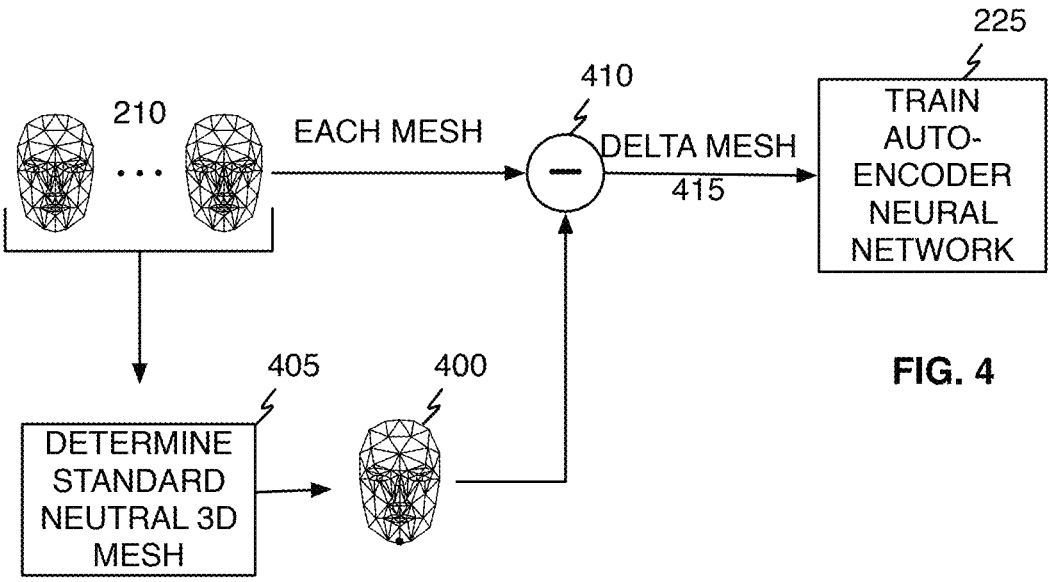
FIG. 4 shows an auto-encoder neural network training operation in accordance with one or more additional embodiments.

Referring to FIG. 4, in another embodiment auto-encoder neural network 220 may be trained with a transformed version of input mesh representations 210. As shown, standard mesh 400 can be determined from the collection of neutral expression meshes 210 (block 405). In some embodiments, each point in standard mesh 400 is the mean or average value of all of the values from the corresponding points in all the neutral expression meshes 210. In other embodiments, each point in standard mesh 400 is the median value of all of the values from the corresponding points in all the neutral expression meshes 210. Other transformations may be used based on the target use of the generated model and may, or may not, include or use all of the neutral expression meshes 210. Standard mesh 400 may then be combined with (e.g., subtracted from) each neutral expression mesh 210 (one at a time) via operator 410 to generate delta mesh 415. Delta mesh 415 may be used to train auto-encoder neural network 220 (block 225). In this approach, auto-encoder neural network 220 is trained to learn the differences between standard mesh 400 and each of the neutral expression meshes 210. In one or more embodiments, operator 410 may calculate the deltas as x, y, z values in Euclidian space, or as deltas transformed into an alternative coordinate frame, such as a cylindrical or spherical coordinate system.

Figure 5:
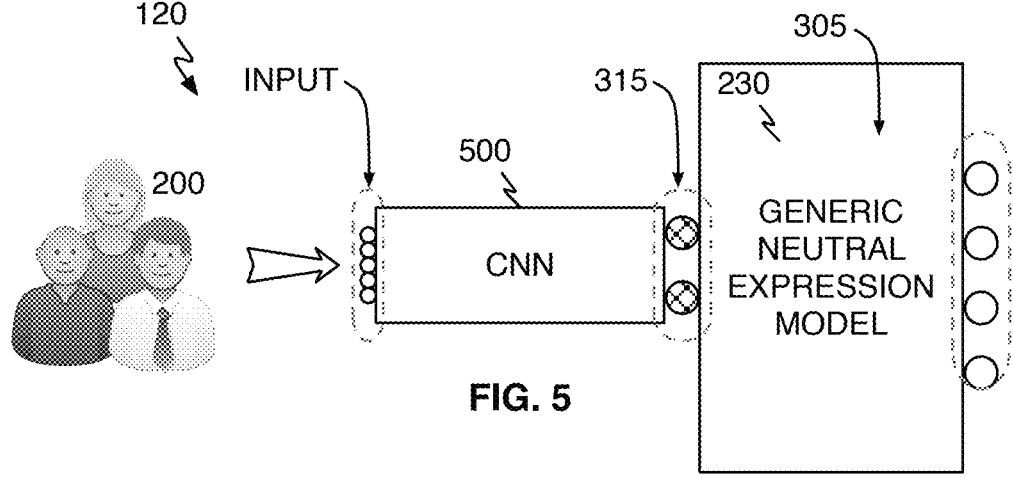
FIG. 5 shows a convolutional neural network (CNN) training operation in accordance with one or more embodiments.

Referring to FIG. 5, CNN training operation 120 in accordance with one or more embodiments applies each neutral expression image (from the collection of neutral expression images 200) to the input layer of CNN 500. In the particular embodiments described herein, generic neutral expression model 230 corresponds to the decoder portion of fully-trained auto-encoder neural network 220 that has been "locked down" (see discussion above). As a consequence, input-to-latent variable-to-output mapping data from fully trained auto-encoder neural network 220 can be used to train CNN 500.

Figure 6:
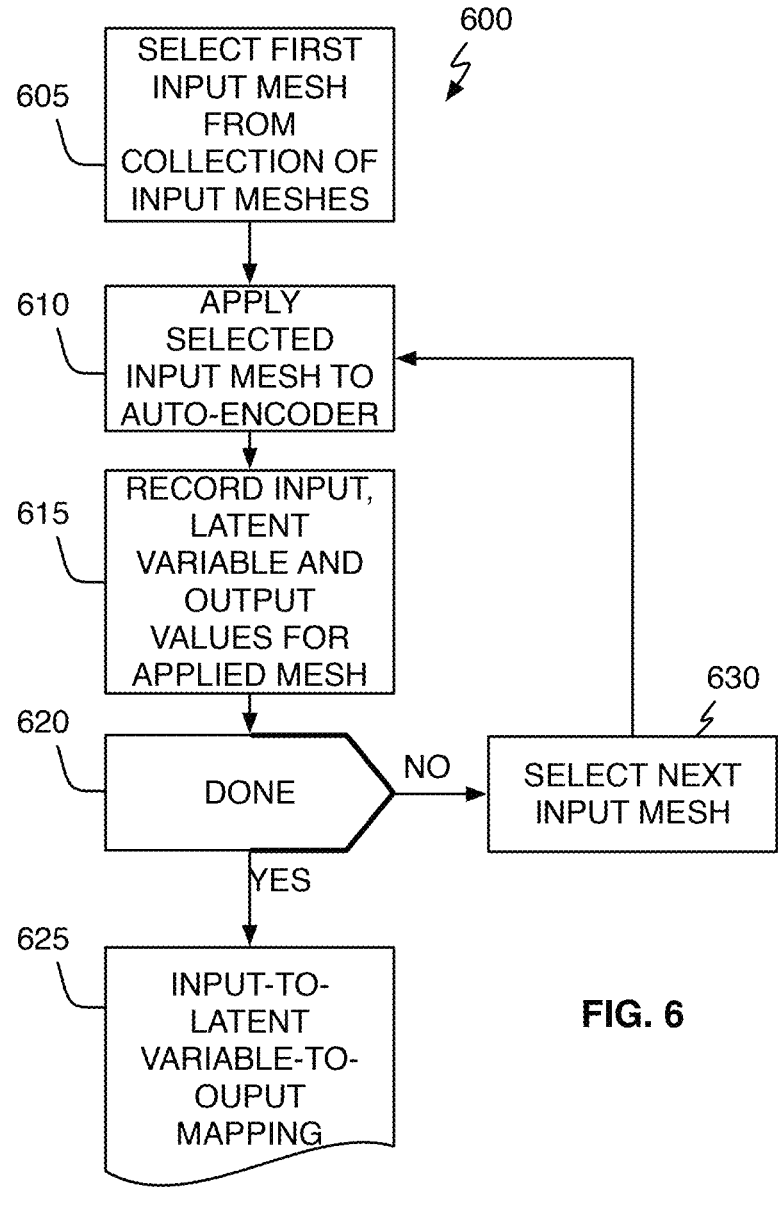
FIG. 6 shows, in flowchart form, a neutral expression input-to-latent variable-to-output mapping data acquisition operation in accordance with one or more embodiments.

Referring to FIG. 6, neutral expression input-to-latent variable-to-output mapping data acquisition operation 600 begins by selecting a first input mesh from the collection of input meshes 210 (block 605). The selected mesh is then applied to fully-trained auto-encoder neural network 220's input layer (block 610), where after the input mesh's input values at each input node in input layer 300, the resulting latent variable values at each node in selected hidden layer 315, and the resulting output values for each output node in output layer 305 may be recorded (block 615). If all input meshes from the collection of input meshes 210 have been applied in accordance with block 610-615 (the "YES" prong of block 620), the recorded input-to-latent variable-to-output mapping data 625 is complete. If at least one input mesh has not been applied in accordance with block 610-615 (the "NO" prong of block 620), a next input mesh can be selected (block 630), where after operation 600 continues at block 610. In some embodiments, photogrammetry or stereophotogrammetry operations may include the ability to obtain camera azimuth and elevation data. This data may also be used during CNN training procedure 120. Alternatively, CNN 500 may be trained using synthetically generated images for a large number of subjects wherein viewing angles and lighting conditions may also be encoded and used during CNN training operation 120.

Figure 7:
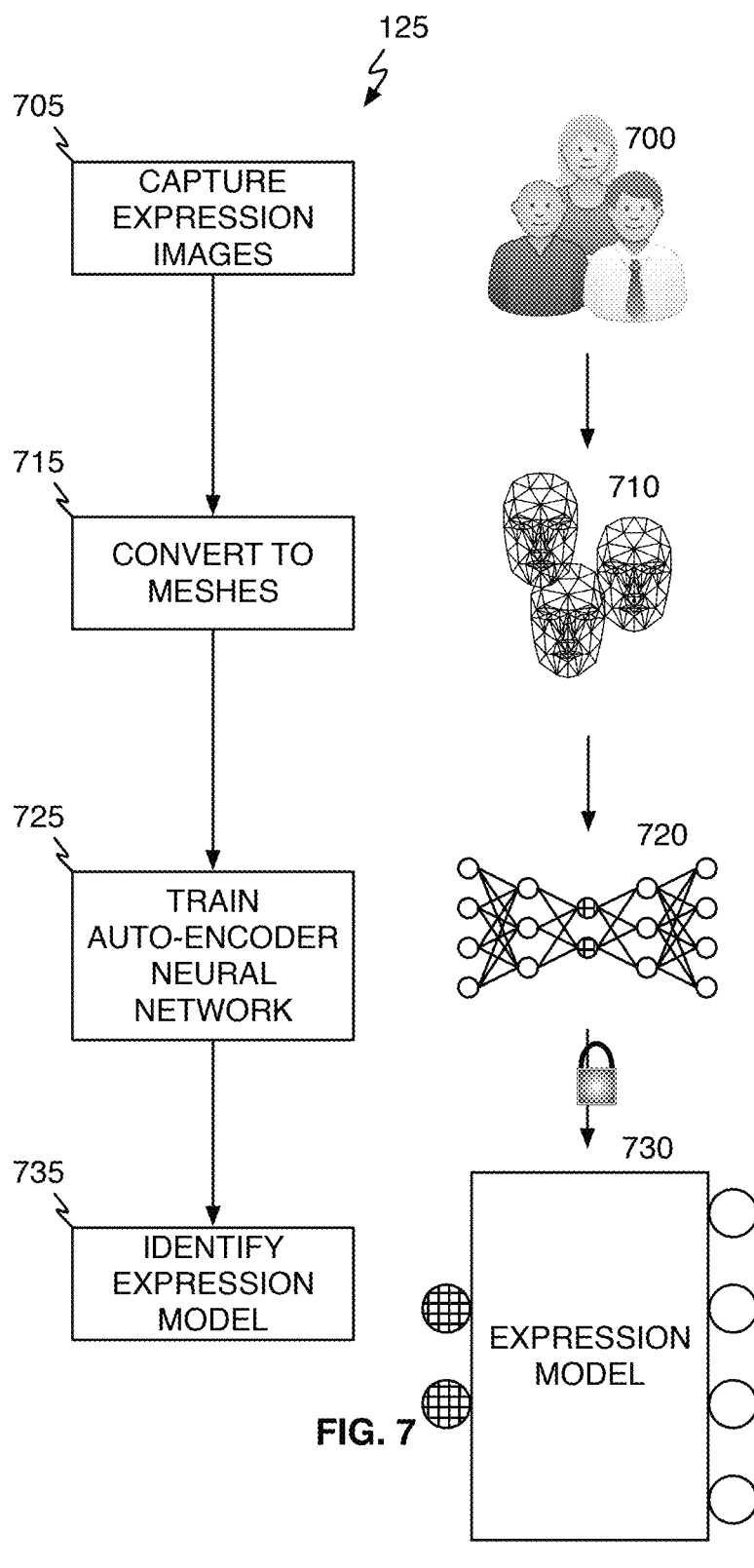
FIG. 7 shows, in flowchart form, an expression model generation operation in accordance with one or more embodiments.

Referring to FIG. 7, in one or more embodiments expression model generation operation 125 can proceed along in much the same manner as neutral expression model generation operation 115. First, expression images 700 from a relatively large number of individuals may be acquired (block 705). As used here, the phrase "expression image"

means an image of an individual having a non-neutral expression (e.g., happy, sad, excited, fearful, questioning, etc.). By way of example, images 700 may be obtained via a photogrammetry or stereophotogrammetry system, a laser scanner or an equivalent capture method. Each expression image 700 may be converted into an expressive 3D mesh representation 710 (block 215) and used to train another auto-encoder neural network 720 (block 725). From auto-encoder neural network 720, expression model 730 can be identified (block 735). As before, expression model 730 can be the "decoder" portion of fully-trained auto-encoder neural network 720 that has been locked so that its internal node values no longer change or adapt to input.

Figure 8:
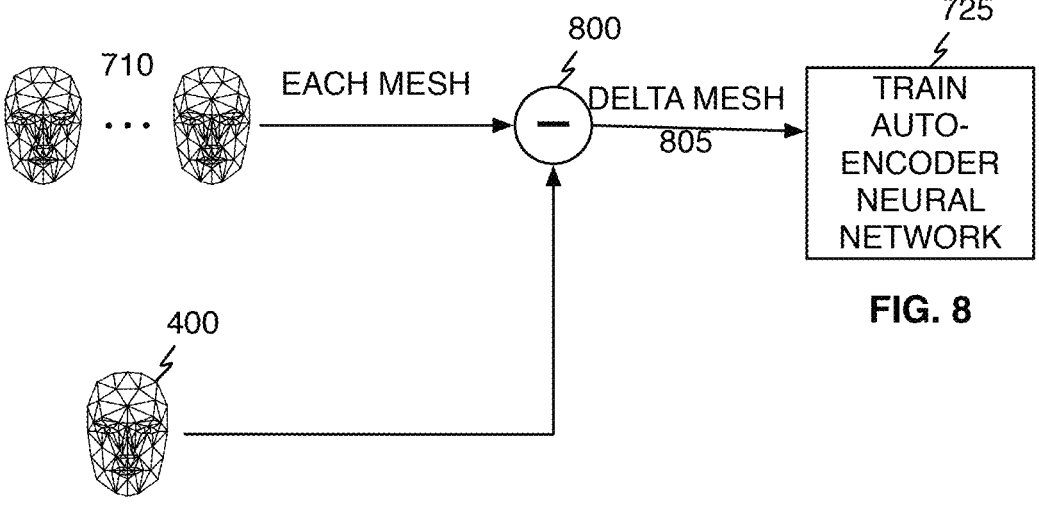
FIG. 8 shows, in flowchart form, yet another auto-encoder neural network training operation in accordance with one or more embodiments.

Referring to FIG. 8, in one embodiment auto-encoder neural network 720 may be trained with a transformed version of input mesh representations 710. As shown, standard mesh 400 (see discussion above) can be combined with (e.g., subtracted from) each expression mesh 710 (one at a time) via operator 800 to generate delta mesh 805. Delta mesh 805, in turn, may be used to train auto-encoder neural network 720 (block 725). In this approach, auto-encoder neural network 720 is trained to learn the differences between the neutral mesh for that identity—and each of the expression meshes 210.

Figure 10:
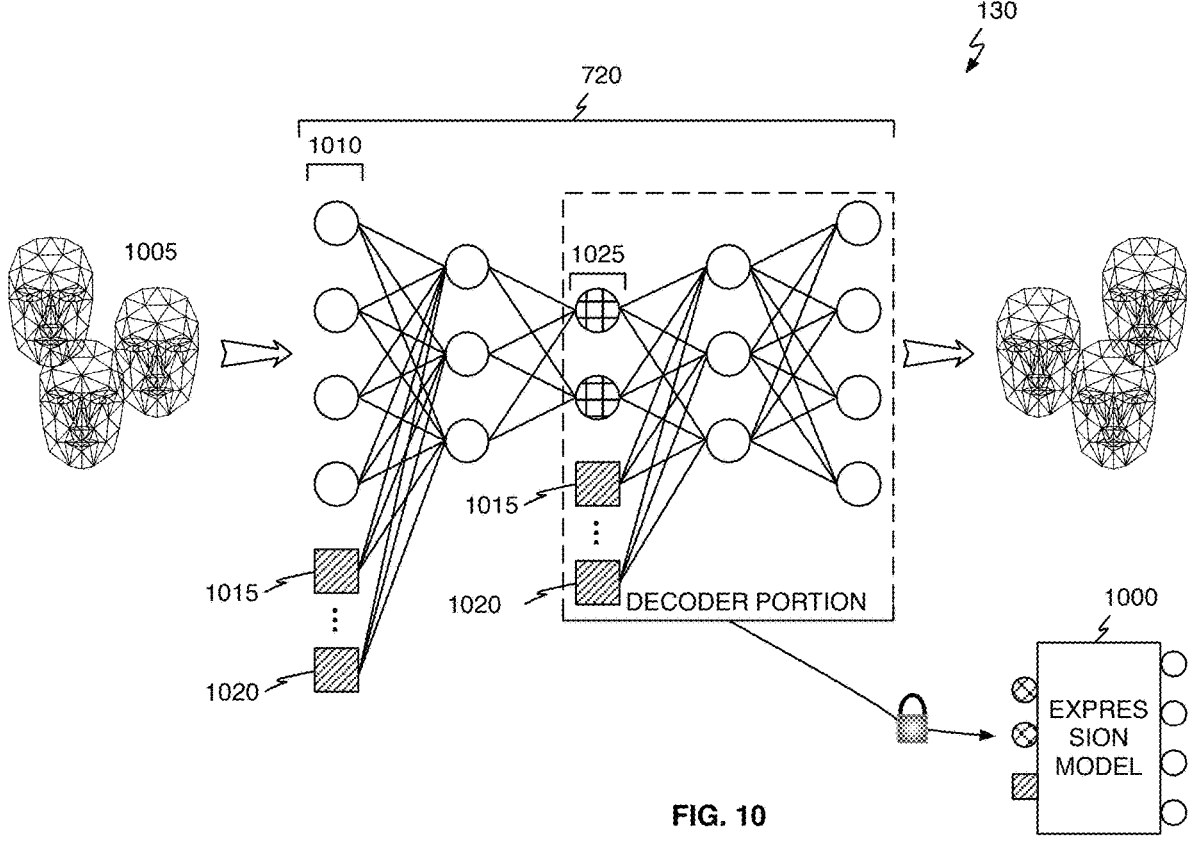
FIG. 10 shows another neural network training operation in accordance with one or more embodiments.

Referring to FIG. 10, optional conditional variables may be used to generate expression model 1000 to further refine the model's output (block 130). To accomplish this, expression input 1005 (e.g., meshes 710 or delta meshes 805) to latent variable to output mapping data may be acquired in the same manner as described above with respect to FIG. 6. Desired conditional variables may then be identified and used to, again, train auto-encoder 720. As shown, expression input 1005 may be applied to auto-encoder 720'S input layer 1010 in combination with selected conditional variables 1015 and 1020. Selected conditional variables are also applied to chosen hidden layer 1025. Thereafter training of auto-encoder 720 proceeds as described above with respect to FIGS. 7 and 8. Illustrative conditional variables include, but are not limited to, gender, age, body mass index, emotional state (e.g., happy, sad, confused), camera azimuth and elevation data.

Figure 9:
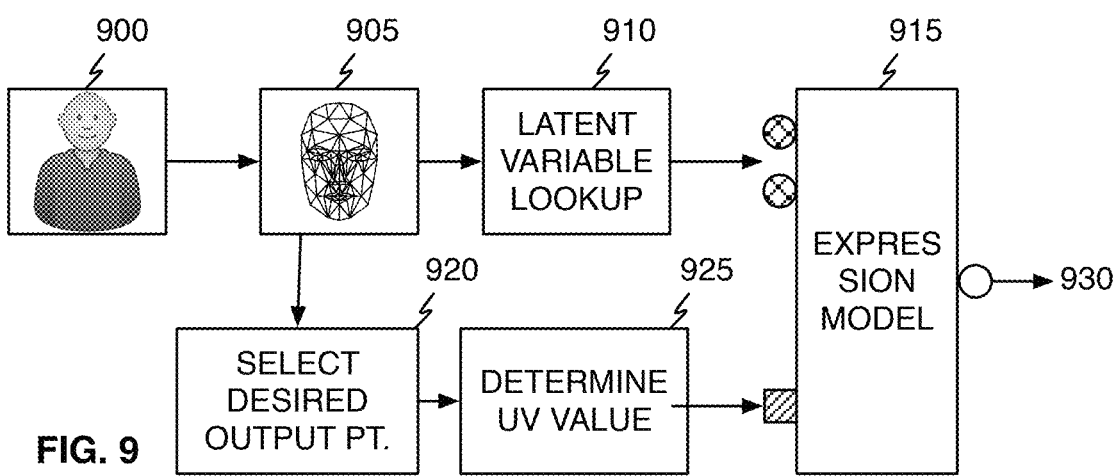
FIG. 9 shows an avatar manipulation operation in another one or more embodiments.

One alternative form of the decoder network is the addition of a UV mapping. A UV mapping is a known technique to create a two-dimensional (2D) reference value for each point on a 3D mesh. Since UV mappings are a property of the mesh, and the mesh topology is the same for all images in meshes 1005, the UV mapping is the same for all captured images. In light of this recognition, the use of UV values as inputs may be used to generate a model whose output is resolution independent. By way of example, consider FIG. 9 in which an input image is captured (block 900), converted to a mesh representation (block 905), and the mesh value used to identify corresponding latent variable values (block 910) which are then applied to single-output expression model 915. A particular point in the mesh is then selected for which output is to be generated (block 920), its corresponding UV mapping value determined (block 925) and applied to single-output expression model 915. Model output 930 corresponds to the selected node in the input image's 3D mesh as determined by expression model 915. If the desired output resolution is the same as the input meshes resolution, operations 920 and 925 may be repeated for every node in the input mesh. If the desired output resolution is one-half the input meshes resolution, operations 920 and 925 may be repeated for every other node in the input mesh. If the desired output resolution is one-tenth the input meshes resolution, operations 920 and 925 may be repeated for every tenth node in the input mesh.

Figure 11:
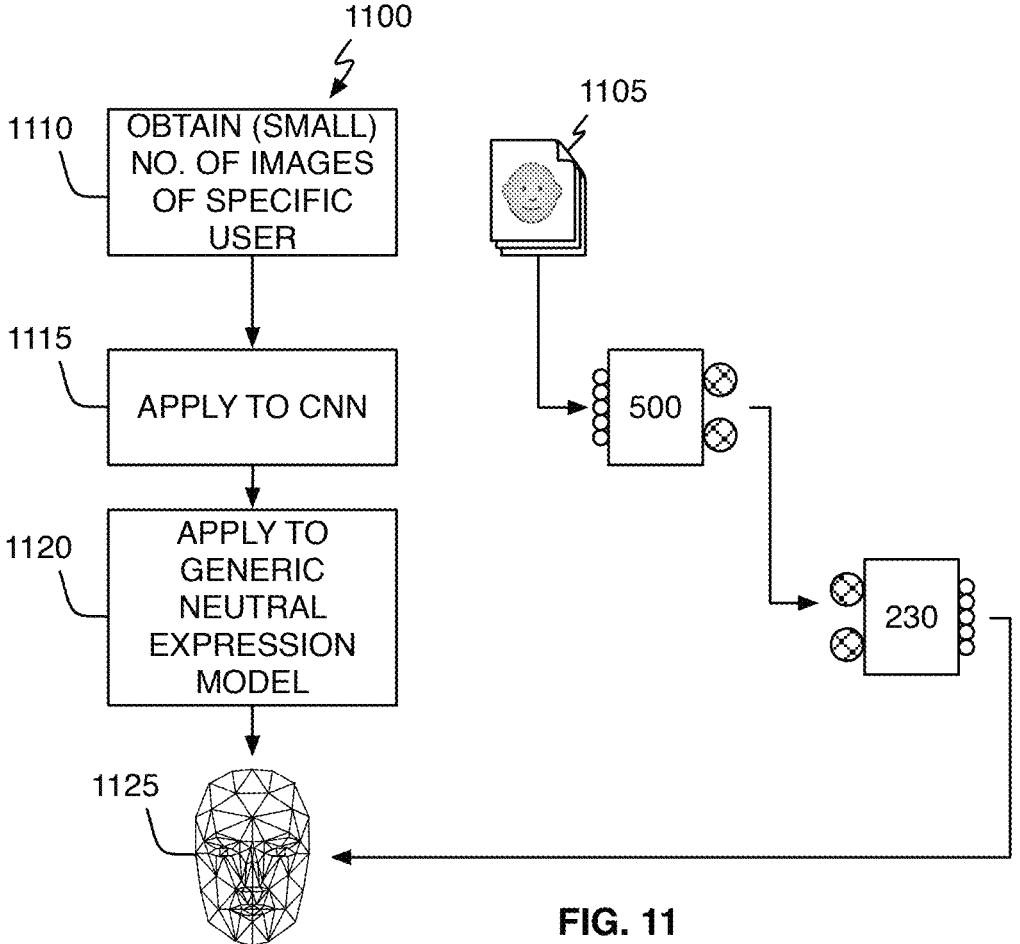
FIG. 11 shows a specific user's neutral expression mesh generation operation in accordance with one or more embodiments.

As described above, the models generated per FIG. 1 (blocks 115-130) are based on a population of known images and, as such, may be considered baseline or generic in nature. Such models may be stored on a user's electronic device (e.g., a smart-phone or tablet computer system as indicated at 135 in FIG. 1) and updated or modified in real-time in accordance with this disclosure. Referring to FIG. 11, a specific user's neutral expression mesh generation operation 1100 in accordance with one embodiment begins by obtaining a relatively small number of images 1105 such as a short video sequence (block 1110) that, frame-by-frame may be applied to CNN 500 (block 1115) whose output drives generic neutral expression model 230 (block 1120). The output of which is the specific user's neutral mesh 1125. Mesh 1125 may be stored in the device's memory for subsequent use, may be generated anew for each use, or may be generated and stored for some period of time, after which it can be deleted. If image sequence 1105 comprises 50 frames or images, user-specific neutral mesh 1125 may be the average or mean of the 50 corresponding output meshes (e.g., output from generic neutral expression model 230). Other combinations of the generated output meshes may also be used (e.g., median).

Figure 12:
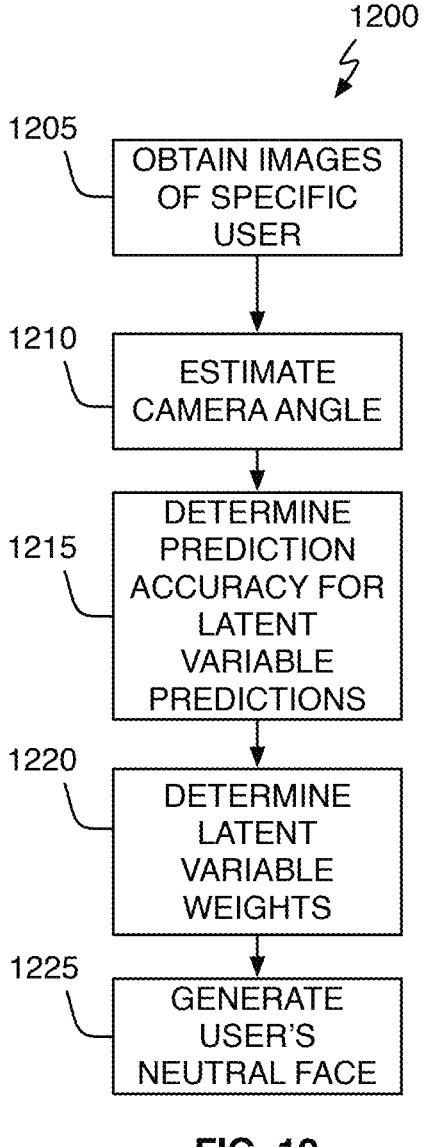
FIG. 12 shows, in flowchart form, a specific user's neutral expression mesh generation operation in accordance with one or more embodiments.

Referring to FIG. 12, a specific user's neutral expression mesh generation operation 1200 in accordance with another approach begins by obtaining a relatively small number of images of the specific person (block 1205). By way of example, the user could use their smart-phone to capture a few seconds of video while moving the device's camera around their face and/or head. This process could provide a relatively large collection of images; 300 frames for 10 seconds of capture at 30 frames-per-second (fps), along with camera angles for each image from both CNN 500 and the device's inertial measurement unit (IMU). Images from this set could be culled so as to end up with a reasonable number of images. For example, of the 300 frames perhaps only every fifth, seventh or tenth frame could be selected. In another embodiment, of the 300 originally collected images or frames, view angles could be used to select a sub-set of frames (e.g., 30 frames) that are uniformly sampled from the range of viewing angles. (Images with to much "blur" or other optical blemishes could also be selected for winnowing.) These selected images would be fed into CNN 500, which would then output latent variable values for each viewing angle (block 1210). Unfortunately, some of the view or camera angles will not produce good, strong or robust estimates for some of the latent variables. For example, a camera position directly in front of the user will generally not produce a good estimate of the latent variables associated with the length and profile shape of the user's nose or ears. Similarly, a camera angle of the side of the face will not produce a good, strong or robust estimate of the latent variables associated with the width of the user's face or the distance between their eyes. To address this issue, one can weight the contribution of the latent variables to the latent variable's average based on the camera angle. Camera angle may be derived directly from the smart-phone camera's IMU unit, it may be estimated via the CNN, or both. In one or more embodiments, CNN angle output and the IMU angle deltas may be applied as inputs to a Kalman filter that can then generate a good estimate of camera orientation. (Camera rotations around the view axis can be corrected or brought back to a vertical camera orientation by a 2D rotation of the image prior to submitting the image as input to the CNN.) To estimate the contribution of each individual frame's latent variables to the weighted average, the prediction accuracy of the CNN for each latent variable at each viewing angle is determined (block 1215). Once CNN training is complete using a test set of images, those same images may be used together with their corresponding known latent variable values to calculate the standard deviation (D) of the predictions from the known values for each viewing angle (see discussion above regarding FIG. 5). This gives an estimate of how well the CNN is able to contribute information about the shape of the face from each viewing angle. In one embodiment, for each selected viewing angle, each latent variable estimate (i.e., CNN output) may be weighted by the normalized $1/\sigma$ value for that viewing angle (where the sum of all weights=1.0) (block 1220). Note, other possible weighting schemes may also be used. This operation, in effect, seeks a set of opinions about the likely latent variables' values and weights those opinions by the demonstrated accuracy of those opinions. The result is a set of weighted average latent variables whose values are derived primarily from the viewing angles at which those values can be inferred most accurately. The determined weights may then be applied to the latent variable output for each image in the user neutral set (e.g., the images selected in accordance with block 1205), to generate the user's neutral face image (block 1225).

Figure 13:
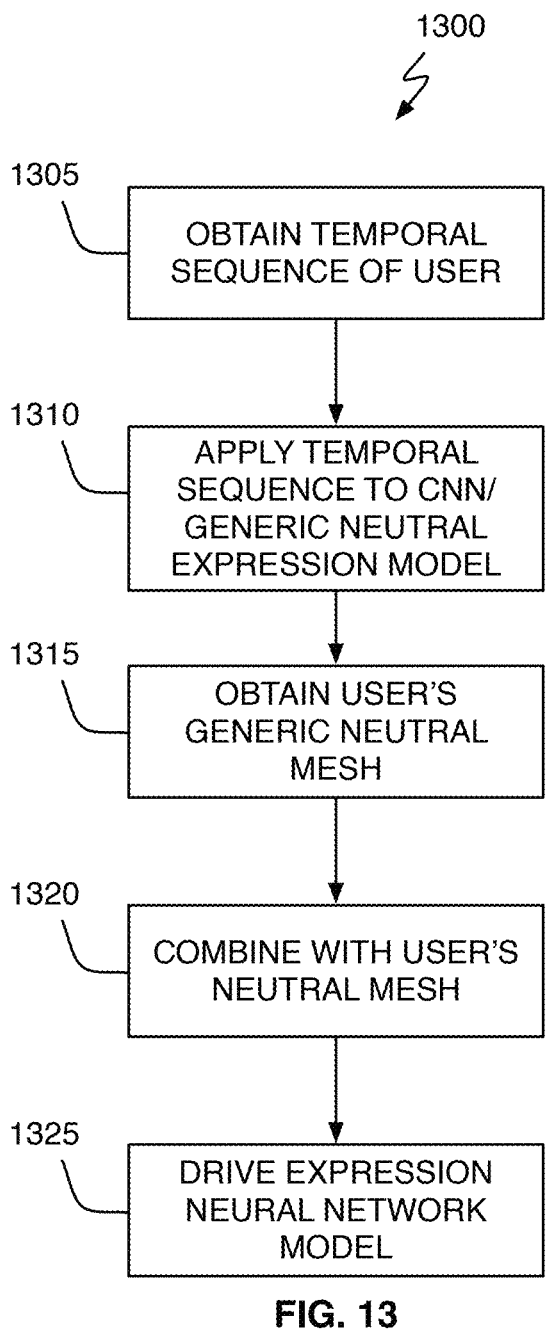
FIG. 13 shows, in flowchart form, a use case in accordance with one or more embodiments.

Phase-2 operations 110 can begin once the neutral and expression models (e.g., 230, 730, 1000 and 915) and CNN (e.g., 500) have been trained. Referring to FIG. 13, use case 1300 in accordance with one or more embodiments begins with the capture of a temporal sequence of images/frames of a user (block 1305). A video sequence is one example of such a temporal sequence. The obtained image sequence may be fed into the previously trained CNN and generic neutral expression model (block 1310) to yield a generic neutral mesh for the user (block 1315). This generic neutral mesh may be combined with the user's specific neutral mesh as described, for example, with respect to FIG. 12 (block 1320) and the resulting mesh used to drive the a priori determined expression model (block 1325).

Figure 14:
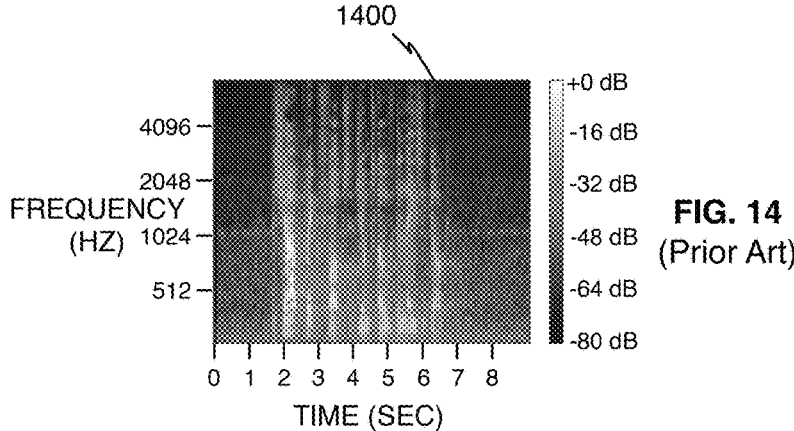
FIG. 14 shows an illustrative mel-frequency cepstrum (MFC).

In another embodiment, an audio track can be reduced to an image in the form of a mel-frequency cepstrum (MFC) and used to drive both Phase-1 105 and Phase-2 110 operations. Referring to FIG. 14, MFC 1400 can be used as input to a CNN (e.g., CNN 500) trained with the latent variables of a decoder (e.g., decoder portion 230). To do this, spectrogram 1400 could be fed into a CNN as a slice viewed through a moving window, where the window can be one or more frames wide. In one specific embodiment theses slices would be used to train a recurrent neural network so that their time history was incorporated. Other audio models may also be used.

Figure 15:
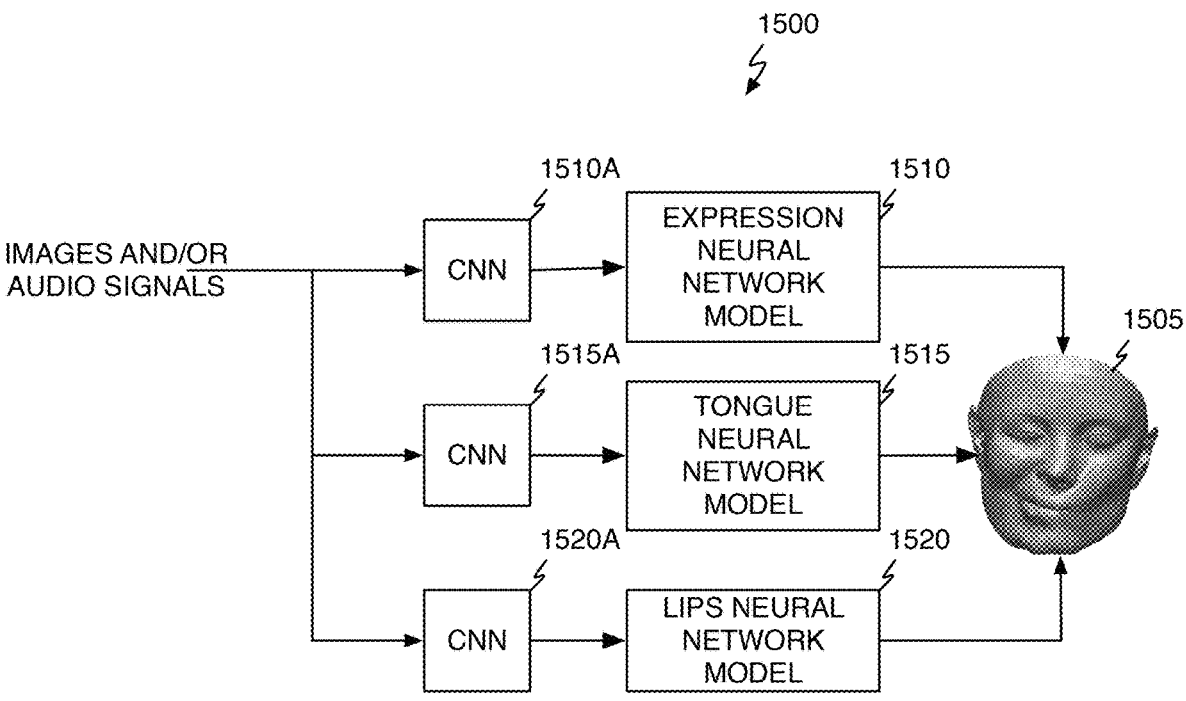
FIG. 15 shows an avatar system in accordance with one or more embodiments.

It has been found that subtle motions of the human face that are left out of a model may be very important to a viewer's acceptance of the generated avatar as "authentic" or "real" (e.g., the sagging of a cheek when speech stops, the movement of lips, and the motion of the tongue). While viewers may not be able to articulate why an avatar without these motions is "not right," they nonetheless make this decision. To incorporate these types of motions into models in accordance with this disclosure, meshes of these particular aspects of a person may be used to train auto-encoder neural networks as described above. Referring to FIG. 15, avatar system 1500 drives avatar 1505 through three separate model paths: expression or facial neural network model 1510; tongue neural network model 1515; and lips neural network model 1520. In some embodiments, avatar 1500 may be driven by both audio and video signals in a manner similar to that described for the weighting of different views for the neutral pose estimation (e.g., see discussion with respect to FIG. 13). For example, if an audio signal is used as input, it will be able to predict lip and tongue motions fairly well but will not be able to predict facial expressions, facial emotions or eye blinks. In other words, the CNNs driven by audio will have a strong opinion about lip motions for speech (e.g., CNN 1515A and 1520A), but weak or inaccurate opinions about other facial motion. A video based CNN may have strong opinions about general facial expressions and eyelid movement (e.g., 1510A), but weak opinions about lip and tongue motion, particularly if the cameras used are not able to see the lips and tongue clearly. Combining the two sets of inputs with appropriate weightings for each latent variable can give a better set of predictions than from either CNN in isolation. It should be further noted that any number of sub-models (e.g., 1510, 1515 and 1520) may be used, the exact number chosen depending upon the target operating environment and operational goals.

Figure 16:
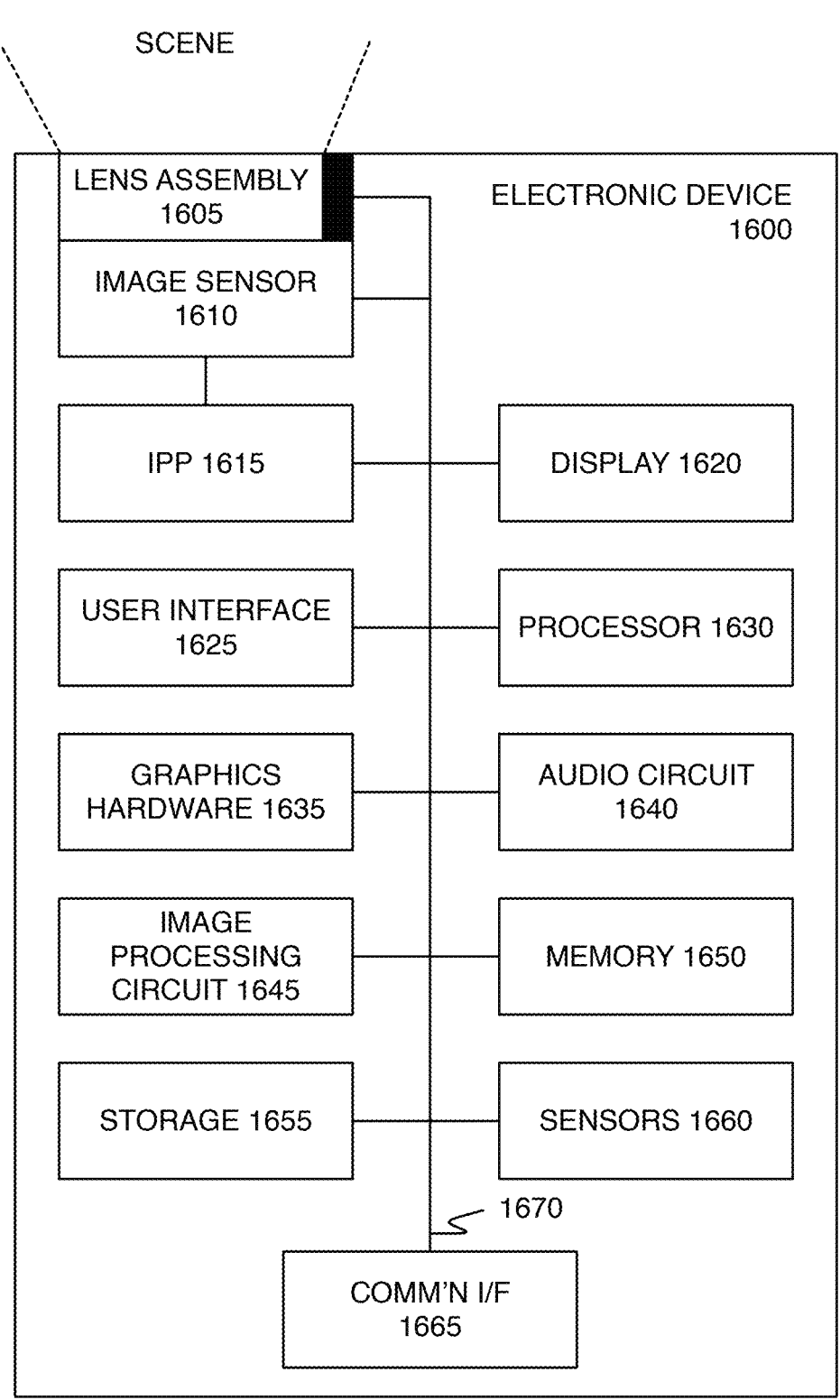
FIG. 16 shows, in block diagram form, a multi-function electronic device in accordance with one or more embodiments.

Referring to FIG. 16, a simplified functional block diagram of illustrative electronic device 1600 is shown according to one or more embodiments. Electronic device 1600 may be used to acquire user images (e.g., a temporal sequence of image frames) and generate and animate an avatar in accordance with this disclosure. As noted above, illustrative electronic device 1600 could be a mobile telephone (aka, a smart-phone), a personal media device or a notebook computer system. As shown, electronic device 1600 may include lens assemblies 1605 and image sensors 1610 for capturing images of a scene (e.g., a user's face). By way of example, lens assembly 1605 may include a first assembly configured to capture images in a direction away from the device's display 1620 (e.g., a rear-facing lens assembly) and a second lens assembly configured to capture images in a direction toward or congruent with the device's display 1620 (e.g., a front facing lens assembly). In one embodiment, each lens assembly may have its own sensor (e.g., element 1610). In another embodiment, each lens assembly may share a common sensor. In addition, electronic device 1600 may include image processing pipeline (IPP) 1615, display element 1620, user interface 1625, processor(s) 1630, graphics hardware 1635, audio circuit 1640, image processing circuit 1645, memory 1650, storage 1655, sensors 1660, communication interface 1665, and communication network or fabric 1670.

Lens assembly 1605 may include a single lens or multiple lens, filters, and a physical housing unit (e.g., a barrel). One function of lens assembly 1605 is to focus light from a scene onto image sensor 1610. Image sensor 1610 may, for example, be a CCD (charge-coupled device) or CMOS (complementary metal-oxide semiconductor) imager. IPP 1615 may process image sensor output (e.g., RAW image data from sensor 1610) to yield a HDR image, image sequence or video sequence. More specifically, IPP 1615 may perform a number of different tasks including, but not be limited to, black level removal, de-noising, lens shading correction, white balance adjustment, demosaic operations, and the application of local or global tone curves or maps. IPP 1615 may comprise a custom designed integrated circuit, a programmable gate-array, a central processing unit (CPU), a graphical processing unit (GPU), memory, or a combination of these elements (including more than one of any given element). Some functions provided by IPP 1615 may be implemented at least in part via software (including firmware). Display element 1620 may be used to display text and graphic output as well as receiving user input via user interface 1625. In one embodiment, display element 1620 may be used to display the avatar of an individual communicating with the user of device 1600. Display element 1620 may also be a touch-sensitive display screen. User interface 1625 can also take a variety of other forms such as a button, keypad, dial, a click wheel, and keyboard. Processor 1630 may be a system-on-chip (SOC) such as those found in mobile devices and include one or more dedicated CPUs and one or more GPUs. Processor 1630 may be based on reduced instruction-set computer (RISC) or complex instruction-set computer (CISC) architectures or any other suitable architecture and each computing unit may include one or more processing cores. Graphics hardware 1635 may be special purpose computational hardware for processing graphics and/or assisting processor 1630 perform computational tasks. In one embodiment, graphics hardware 1635 may include one or more programmable GPUs each of which may have one or more cores. Audio circuit 1640 may include one or more microphones, one or more speakers and one or more audio codecs. Image processing circuit 1645 may aid in the capture of still and video images from image sensor 1610 and include at least one video codec. Image processing circuit 1645 may work in concert with IPP 1615, processor 1630 and/or graphics hardware 1635. Images, once captured, may be stored in memory 1650 and/or storage 1655. Memory 1650 may include one or more different types of media used by IPP 1615, processor 1630, graphics hardware 1635, audio circuit 1640, and image processing circuitry 1645 to perform device functions. For example, memory 1650 may include memory cache, read-only memory (ROM), and/or random access memory (RAM). Storage 1655 may store media (e.g., audio, image and video files), computer program instructions or software, preference information, device profile information, pre-generated models (e.g., generic neutral expression model 230, CNN 500, expression model 730, 915, 1000), frameworks, and any other suitable data. When executed by processor module 1630 and/or graphics hardware 1635 such computer program code may implement one or more of the methods described herein (e.g., see FIGS. 1-15). Storage 1655 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Device sensors 1660 may include, but need not be limited to, one or more of an optical activity sensor, an optical sensor array, an accelerometer, a sound sensor, a barometric sensor, a proximity sensor, an ambient light sensor, a vibration sensor, a gyroscopic sensor, a compass, a magnetometer, a thermistor sensor, an electrostatic sensor, a temperature sensor, and an opacity sensor. Communication interface 1665 may be used to connect device 1600 to one or more networks. Illustrative networks include, but are not limited to, a local network such as a universal serial bus (USB) network, an organization's local area network, and a wide area network such as the Internet. Communication interface 1665 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). Communication network or fabric 1670 may be comprised of one or more continuous (as shown) or discontinuous communication links and be formed as a bus network, a communication network, or a fabric comprised of one or more switching devices (e.g., a cross-bar switch).

Figure 17:
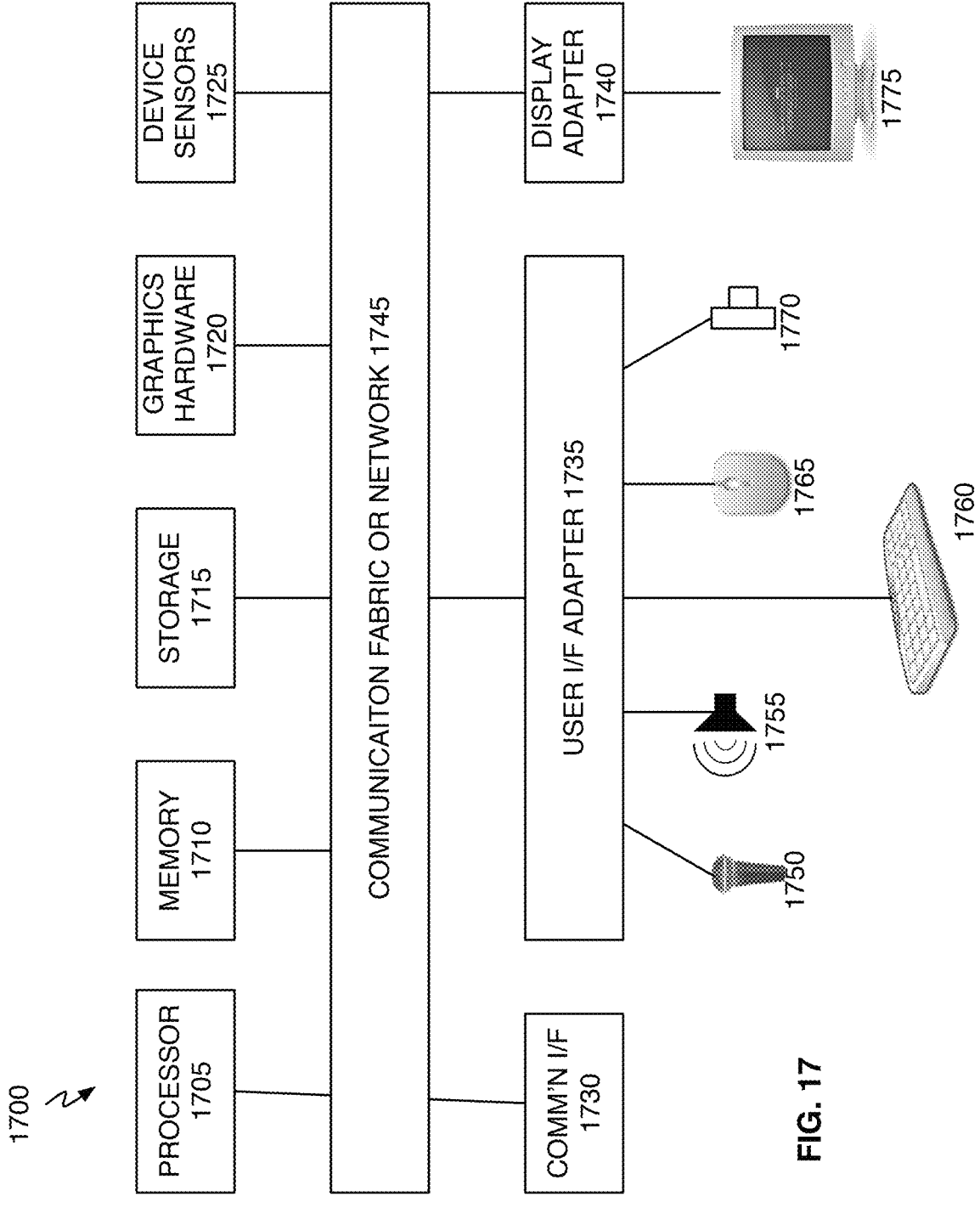
FIG. 17 shows, in block diagram form, a computer system in accordance with one or more embodiments.

Referring to FIG. 17, the disclosed avatar modeling and generation operations may be performed by representative computer system 1700 (e.g., a general purpose computer system such as a desktop, laptop or notebook computer system). Computer system 1700 may include processor element or module 1705, memory 1710, one or more storage devices 1715, graphics hardware element or module 1720, device sensors 1725, communication interface module or circuit 1730, user interface adapter 1735 and display adapter 1740—all of which are coupled via system bus, backplane, fabric or network 1745.

Processor element or module 1705, memory 1710, storage devices 1715, graphics hardware element or module 1720, device sensors 1725, communication interface module or circuit 1730, system bus, backplane, fabric or network 1745, and display 1775 may be of the same or similar type and serve the same function as the similarly named component described above with respect to electronic device 1600. User interface adapter 1735 may be used to connect microphone 1750, speaker 1755, keyboard 1760, pointer device 1765, and other user interface devices such as image capture device 1770 or a touch-pad (not shown). Display adapter 1740 may be used to connect one or more display units 1775 which may provide touch input capability.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 1, 2, 4-8, 11-13 or the arrangement of elements shown in FIGS. 3, 10, 15-17 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable code executable by one or more processors to:

capture a plurality of images of a user having a current expression;

convert the plurality of images to geometric information of the user having the current expression;

obtain a prior-generated user-specific model comprising appearance characteristics of the user based on prior captured images of the user having a different expression than the current expression; and drive the user-specific model using the geometric information.

2. The non-transitory computer readable medium of claim 1, wherein the user-specific model based on a plurality of previously captured images of the user.

3. The non-transitory computer readable medium of claim 1, wherein the plurality of images comprises a temporal sequence of images of a user.

4. The non-transitory computer readable medium of claim 3, wherein the temporal sequence of images is comprised in a video sequence.

5. The non-transitory computer readable medium of claim 3, wherein the computer readable code to convert the plurality of images to geometric information comprises computer readable code to:

generate a generic neutral mesh based on the plurality of images.

6. The non-transitory computer readable medium of claim 5, further comprising computer readable code to:

combine the generic neutral mesh with a predefined user-specific neutral mesh to obtain the geometric information.

7. The non-transitory computer readable medium of claim 5, wherein the generic neutral mesh is generated by a neural network configured to produce the generic neutral mesh for the user based on an input set of images.

8. A method comprising:

capturing a plurality of images of a user having a current expression;

converting the plurality of images to geometric information of the user having the current expression;

obtaining a prior-generated user-specific model comprising appearance characteristics of the user based on prior captured images of the user having a different expression than the current expression; and driving the user-specific model using the geometric information.

9. The method of claim 8, wherein the user-specific model based on a plurality of previously captured images of the user.

10. The method of claim 8, wherein the plurality of images comprises a temporal sequence of expressive images of a user.

11. The method of claim 10, wherein the temporal sequence of images is comprised in a video sequence.

12. The method of claim 10, wherein converting the plurality of images to geometric information comprises:

generating a generic neutral mesh based on the plurality of images.

13. The method of claim 12, further comprising:

combining the generic neutral mesh with a predefined user-specific neutral mesh to obtain the geometric information.

14. The method of claim 12, wherein the generic neutral mesh is generated by a neural network configured to produce the generic neutral mesh for the user based on an input set of images.

15. A system comprising:

one or more processors; and one or more computer readable media comprising computer readable code executable by the one or more processors to:

capture a plurality of images of a user having a current expression;

convert the plurality of images to geometric information of the user having the current expression;

obtain a prior-generated user-specific model comprising appearance characteristics of the user based on prior captured images of the user having a different expression than the current expression; and drive the user-specific model using the geometric information.

16. The system of claim 15, wherein the user-specific model based on a plurality of previously captured images of the user.

17. The system of claim 15, wherein the plurality of images comprises a temporal sequence of images of a user.

18. The system of claim 17, wherein the computer read-able code to convert the plurality of images to geometric information comprises computer readable code to:

generate a generic neutral mesh based on the plurality of images.

19. The system of claim 18, further comprising computer readable code to:

combine the generic neutral mesh with a predefined user-specific neutral mesh to obtain the geometric information.

20. The system of claim 18, wherein the generic neutral mesh is generated by a neural network configured to produce the generic neutral mesh for the user based on an input set of images.

\* \* \* \* \*